United States Patent
Richter et al.

(10) Patent No.: US 11,783,514 B2
(45) Date of Patent: Oct. 10, 2023

(54) GENERATING CONTENT FOR PHYSICAL ELEMENTS

(71) Applicant: Apple Inc., Cupertino, CA (US)

(72) Inventors: Ian M. Richter, Los Angeles, CA (US); Andrew Scott Robertson, Los Angeles, CA (US)

( * ) Notice: Subject to any disclaimer, the term of this patent is extended or adjusted under 35 U.S.C. 154(b) by 0 days.

(21) Appl. No.: 17/484,231

(22) Filed: Sep. 24, 2021

(65) Prior Publication Data

US 2022/0012924 A1 Jan. 13, 2022

Related U.S. Application Data

(63) Continuation of application No. PCT/US2020/034477, filed on May 26, 2020.

(60) Provisional application No. 62/853,852, filed on May 29, 2019.

(51) Int. Cl.
*G06T 11/00* (2006.01)
*G06V 20/40* (2022.01)
*G06T 13/80* (2011.01)

(52) U.S. Cl.
CPC .............. *G06T 11/00* (2013.01); *G06T 13/80* (2013.01); *G06V 20/40* (2022.01); *G06T 2200/24* (2013.01)

(58) Field of Classification Search
None
See application file for complete search history.

(56) References Cited

U.S. PATENT DOCUMENTS

| 2015/0022444 A1 | 1/2015 | Ooi | |
|---|---|---|---|
| 2017/0069134 A1* | 3/2017 | Shapira | G06F 3/011 |
| 2018/0045963 A1* | 2/2018 | Hoover | G06F 3/011 |

OTHER PUBLICATIONS

PCT International Search Report and Written Opinion dated Oct. 19, 2020, International Application No. PCT/US2020/034477, pp. 1-19.

* cited by examiner

*Primary Examiner* — Edward Martello
(74) *Attorney, Agent, or Firm* — Fernando & Partners, LLP

(57) ABSTRACT

First content may be obtained in response to identifying a first physical element of a first object type. The first content may be associated with the first object type. Second content may be obtained in response to identifying a second physical element of a second object type. The second content may be associated with the second object type. The second physical element may be detected as being within a threshold distance of the first physical element. Third content may be generated based on a combination of the first content and the second content. The third content may be associated with a third object type that is different from the first object type and the second object type. The third content may be displayed on the display.

25 Claims, 12 Drawing Sheets

GENERATING CONTENT FOR PHYSICAL ELEMENTS

CROSS-REFERENCE TO RELATED APPLICATION

This application is a continuation of Intl. Patent App. No. PCT/US2020/34477, filed on May 26, 2020, which claims priority to U.S. Provisional Patent App. No. 62/853,852, filed on May 29, 2019, which are both hereby incorporated by reference in their entirety.

TECHNICAL FIELD

The present disclosure generally relates to generating content for physical elements.

BACKGROUND

Some devices may be capable of generating and presenting content. Some devices that present content include mobile communication devices, such as smartphones. Some devices that present content may present representations of physical elements. Some devices that present representations of physical elements may not provide enough attributes with which a user may interact.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
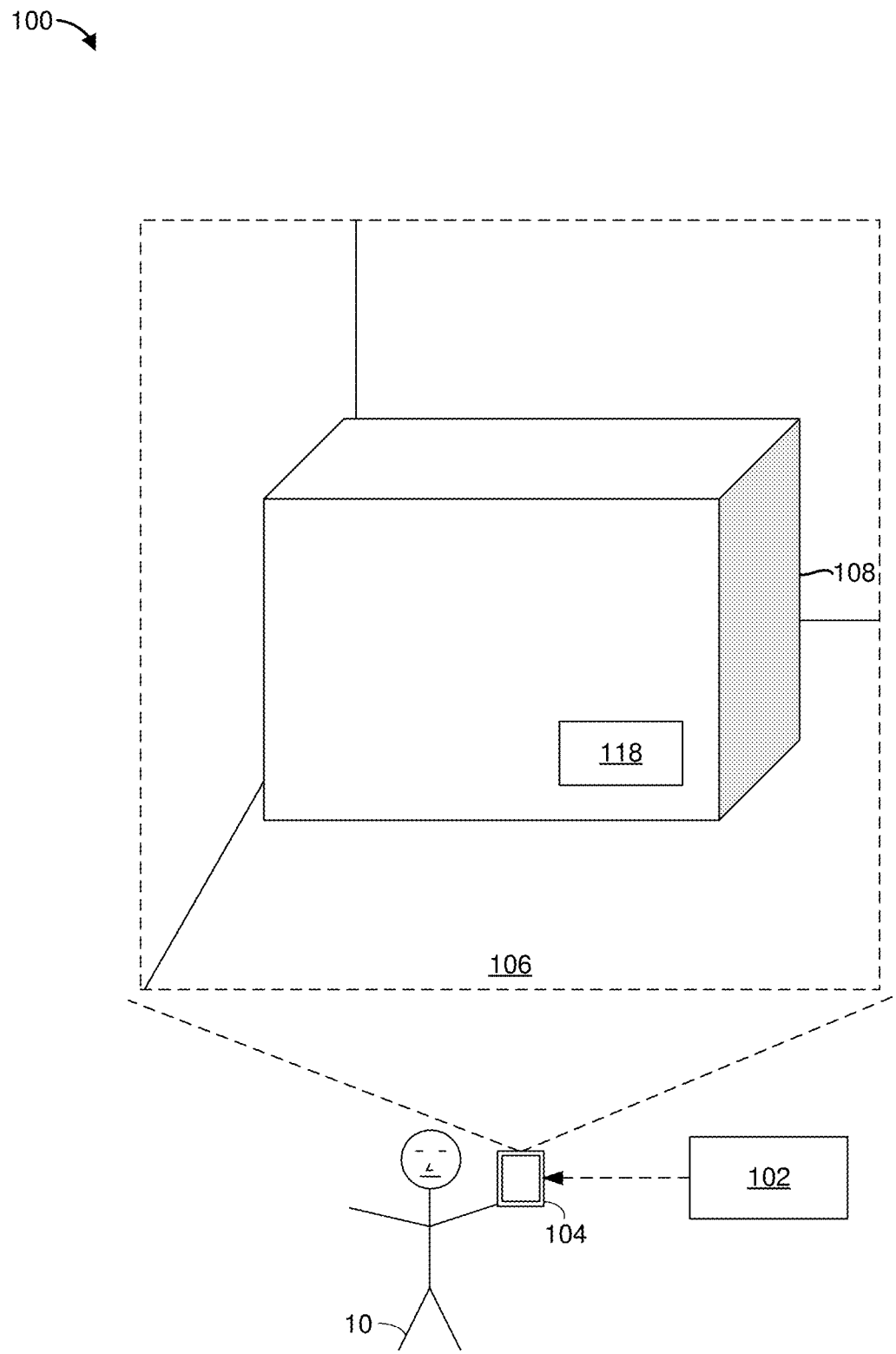
FIGS. 1A-1E are diagrams of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating content for physical elements. In various implementations, a device may include an environmental sensor, a display, a non-transitory memory, and one or more processors coupled with the non-transitory memory. A first content may be obtained in response to identifying a first physical element of a first object type. The first content may be associated with the first object type. A second content may be obtained in response to identifying a second physical element of a second object type. The second content may be associated with the second object type. The second physical element may be detected as being within a threshold distance of the first physical element. A third content may be generated based on a combination of the first content and the second content. The third content may be associated with a third object type that is different from the first object type and the second object type. The third content may be displayed on the display.

In some implementations, a device may include an environmental sensor, a display, a non-transitory memory, and one or more processors coupled with the non-transitory memory. Content may be displayed within or extending from a representation of a physical element. An affordance may be composited in association with a portion of the E content. The affordance may allow manipulation of the portion of the content. An input directed to the affordance may be detected. In response to detecting the input directed to the affordance, a manipulation of the portion of the content may be displayed.

In accordance with some implementations, a device may include one or more processors, a non-transitory memory, and one or more programs. In some implementations, the one or more programs may be stored in the non-transitory memory and may be executed by the one or more processors. In some implementations, the one or more programs may include instructions for performing or causing performance of any of the methods described herein. In accordance with some implementations, a non-transitory computer readable storage medium may have stored therein instructions that, when executed by one or more processors of a device, may cause the device to perform or cause performance of any of the methods described herein. In accordance with some implementations, a device may include one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for detecting a physical element and obtaining and/or presenting XR content based on one or more properties of the physical element. In some implementations, when two physical elements with associated XR content are within a threshold distance of one another, XR content is generated based on the XR content associated with the physical elements. In some implementations, contextual XR content is displayed with an XR representation of a physical element. In some implementations, an affordance is composited in association with the XR content. A user may manipulate the XR content.

FIGS. 1A-1E are block diagrams of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 may include a controller 102 and an electronic device 104. In some implementations, the electronic device 104 includes a smartphone, a tablet, a laptop, or the like. The electronic device 104 may be carried by or worn by a user 10.

As illustrated in FIGS. 1A-1E, in various implementations, the electronic device 104 presents an XR environment 106. In some implementations, the XR environment 106 is generated by the controller 102 and/or the electronic device 104. In some implementations, the XR environment 106 includes a virtual environment that is a simulated replacement of a physical environment. For example, in some implementations, the XR environment 106 is simulated by the controller 102 and/or the electronic device 104. In some implementations, the XR environment 106 may be different from the physical environment in which the electronic device 104 is located.

In some implementations, the XR environment 106 includes an augmented environment that is a modified version of a physical environment. For example, in some implementations, the controller 102 and/or the electronic device 104 modify (e.g., augment) a representation of the physical environment in which the electronic device 104 is located to generate the XR environment 106. In some implementations, the controller 102 and/or the electronic device 104 may generate the XR environment 106 by adding items to the representation of the physical environment in which the electronic device 104 is located.

In some implementations, the controller 102 and/or the electronic device 104 generate the XR environment 106 by simulating a replica of the physical environment in which the electronic device 104 is located. In some implementations, the controller 102 and/or the electronic device 104 may generate the XR environment 106 by removing and/or adding items from the simulated replica of the physical environment in which the electronic device 104 is located.

The XR environment 106 may include extended reality (XR) representations of real objects, e.g., physical elements. For example, the XR environment 106 may include an XR representation of a cereal box 108 ("cereal box 108", hereinafter for the sake of brevity). In some implementations, when the controller 102 and/or the electronic device 104 recognize a physical element as a cereal box, the controller 102 and/or the electronic device 104 obtain XR content 118. In some implementations, the XR content 118 includes the XR representation of the cereal box 108. The XR representation of the cereal box 108 may be rendered in a cutaway view. Rendering a cutaway view may facilitate use of the interior of the cereal box 108 in the XR environment 106. In other words, in some implementations, the XR content 118 is displayed within the XR representation of the cereal box 108. More generally, in various implementations, the XR content 118 is displayed in association with the XR representation of the cereal box 108.

The XR environment 106 may include XR representations of other physical elements, such as an XR representation of a dental floss container 110 shown in FIG. 1B ("dental floss container 110", hereinafter for the sake of brevity) and an XR representation of a lip balm container 112 shown in FIG. 1D ("lip balm container 112", hereinafter for the sake of brevity). In some implementations, when the controller 102 and/or the electronic device 104 recognize a physical element as a dental floss container, the controller 102 and/or the electronic device 104 obtain XR content 120. In some implementations, the XR content 120 includes the XR representation of the dental floss container 110. In some implementations, when the controller 102 and/or the electronic device 104 recognize a physical element as a lip balm container, the controller 102 and/or the electronic device 104 obtain XR content 122. In some implementations, the XR content 122 includes an XR representation of the lip balm container 112. The XR representations may be displayed at locations corresponding to locations of associated physical elements. For example, if, in the physical environment the dental floss container is placed near a side of the cereal box, then the XR representation of the dental floss container 110 may be displayed near the corresponding side of the XR representation of the cereal box 108.

Figure 1B:
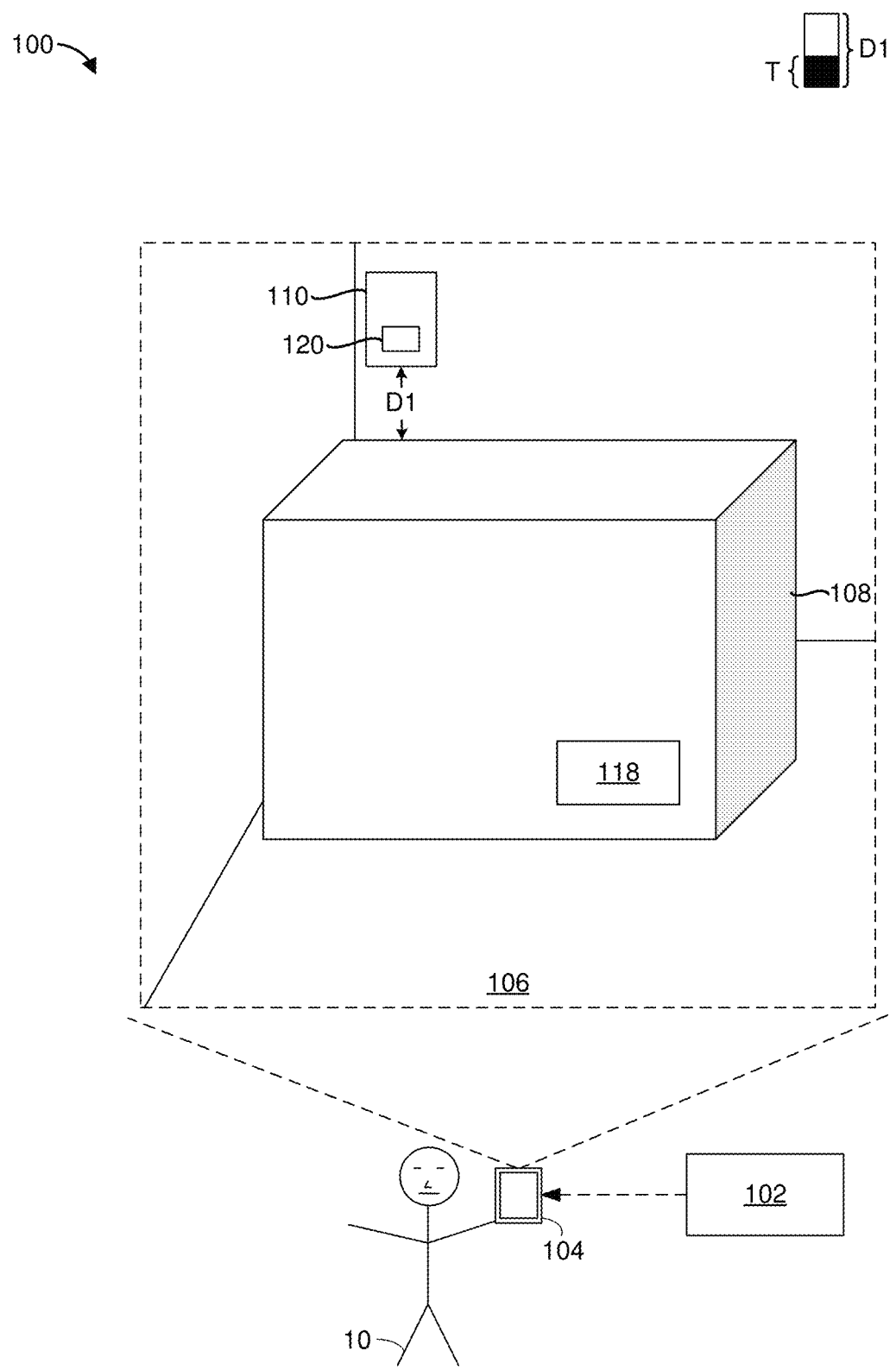

FIG. 1B illustrates the XR environment 106 with an XR representation of another physical element, e.g., the dental floss container 110. The controller 102 and/or the electronic device 104 may identify a real dental floss container in a physical environment, for example, based on environmental data corresponding to the physical environment. The environmental data may include, e.g., depth information, photographic information, and/or video information. FIG. 1B illustrates the dental floss container 110 located at a distance D1 from the cereal box 108 that is greater than a threshold distance T. The threshold distance T may be a fixed distance, may vary or may be selected based on the size of the first physical element and/or the second physical element.

As shown in FIG. 1B, when the distance D1 between the dental floss container 110 and the cereal box 108 is greater than the threshold distance T, the controller 102 and/or the electronic device 104 obtain (e.g., retrieve, synthesize, or generate) and display the XR content 120 associated with the dental floss container 110. For example, in some implementations, the XR content 120 is retrieved from a content datastore. In some implementations, the XR content 120 is synthesized based on one or more characteristics (e.g., physical characteristics, chemical characteristics, electrical characteristics, structural characteristics, functional characteristics, etc.) of the physical element. In some implementations, the XR content 120 is generated based on one or more characteristics of the physical element.

Figure 1C:
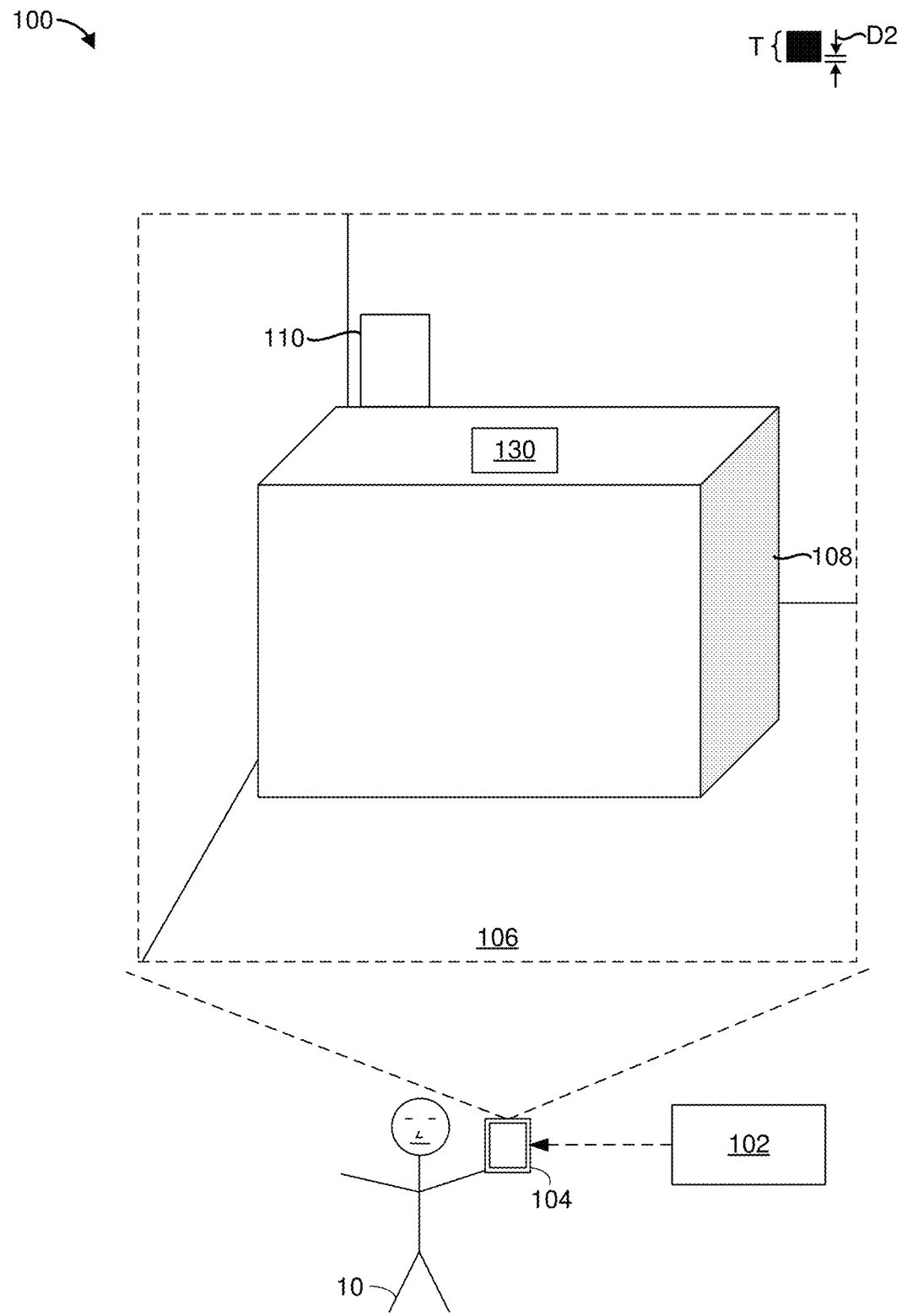

FIG. 1C illustrates the dental floss container 110 located at a distance D2 from the cereal box 108 that is less than the threshold distance T. In some implementations, when the dental floss container 110 is closer than the threshold distance T to the cereal box 108, XR content 130 is generated based on a combination of the XR content 118 and the XR content 120, as disclosed in greater detail herein. In some implementations, the XR content 130 is related to XR representations of both the physical elements (e.g., the cereal box 108 and the dental floss container 110). For example, if the physical element is identified as the dental floss container, the controller 102 and/or the electronic device 104 may generate an XR representation of ropes.

Figure 1D:
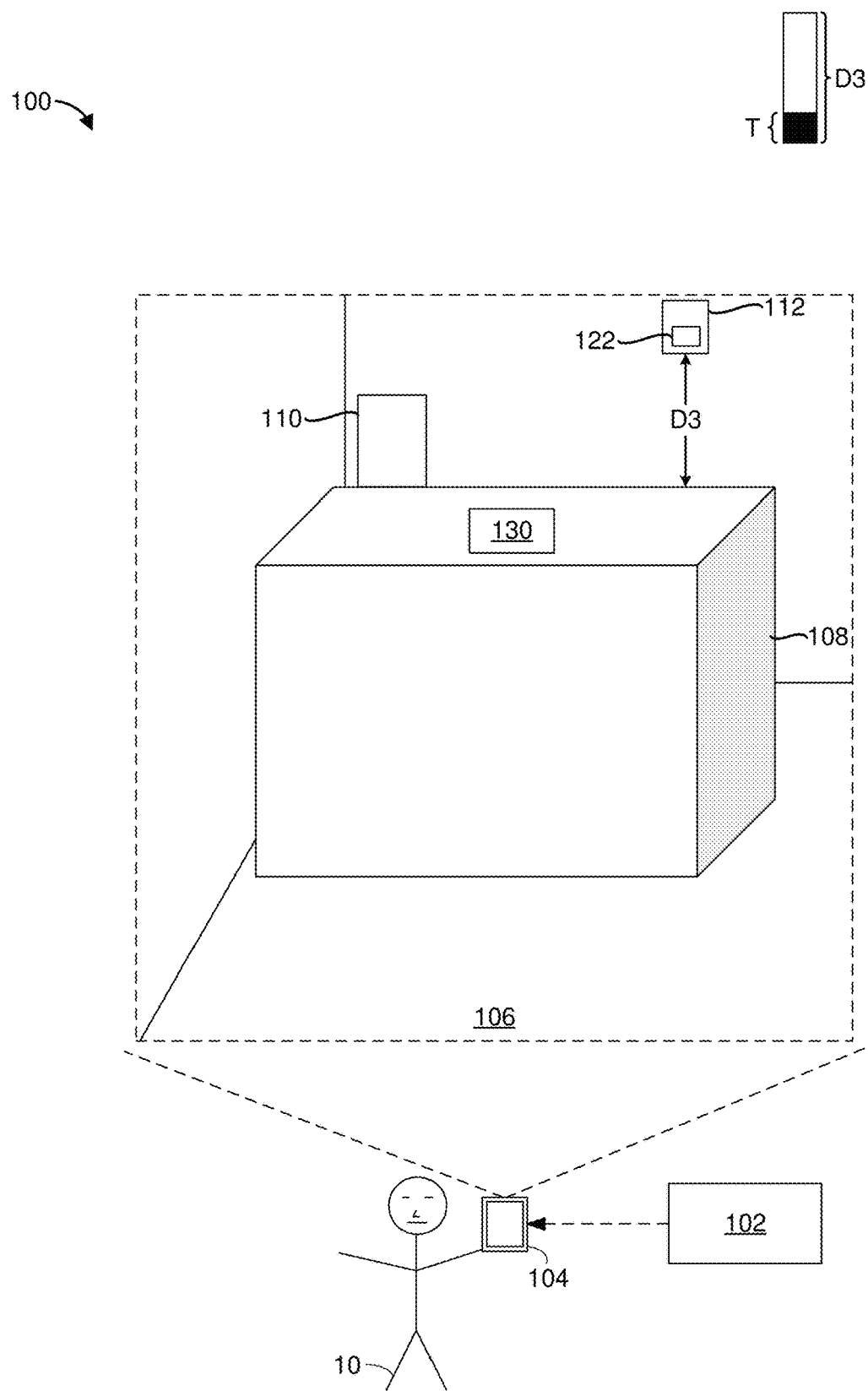

FIG. 1D illustrates the XR environment 106 with an XR representation of another physical element, e.g., the lip balm container 112. The controller 102 and/or the electronic device 104 may identify the lip balm container in a physical environment, for example, based on environmental data corresponding to the physical environment. As shown in FIG. 1D, when the distance D3 between the lip balm container 112 and the cereal box 108 is greater than the threshold distance T, the controller 102 and/or the electronic device 104 obtain (e.g., retrieve, synthesize, or generate) and display XR content 122 associated with the XR representation of the lip balm container 112. As illustrated in FIG. 1D, since the distance D3 is greater than the threshold distance T, the XR content 122 is displayed separate from the XR content 130.

Figure 1E:
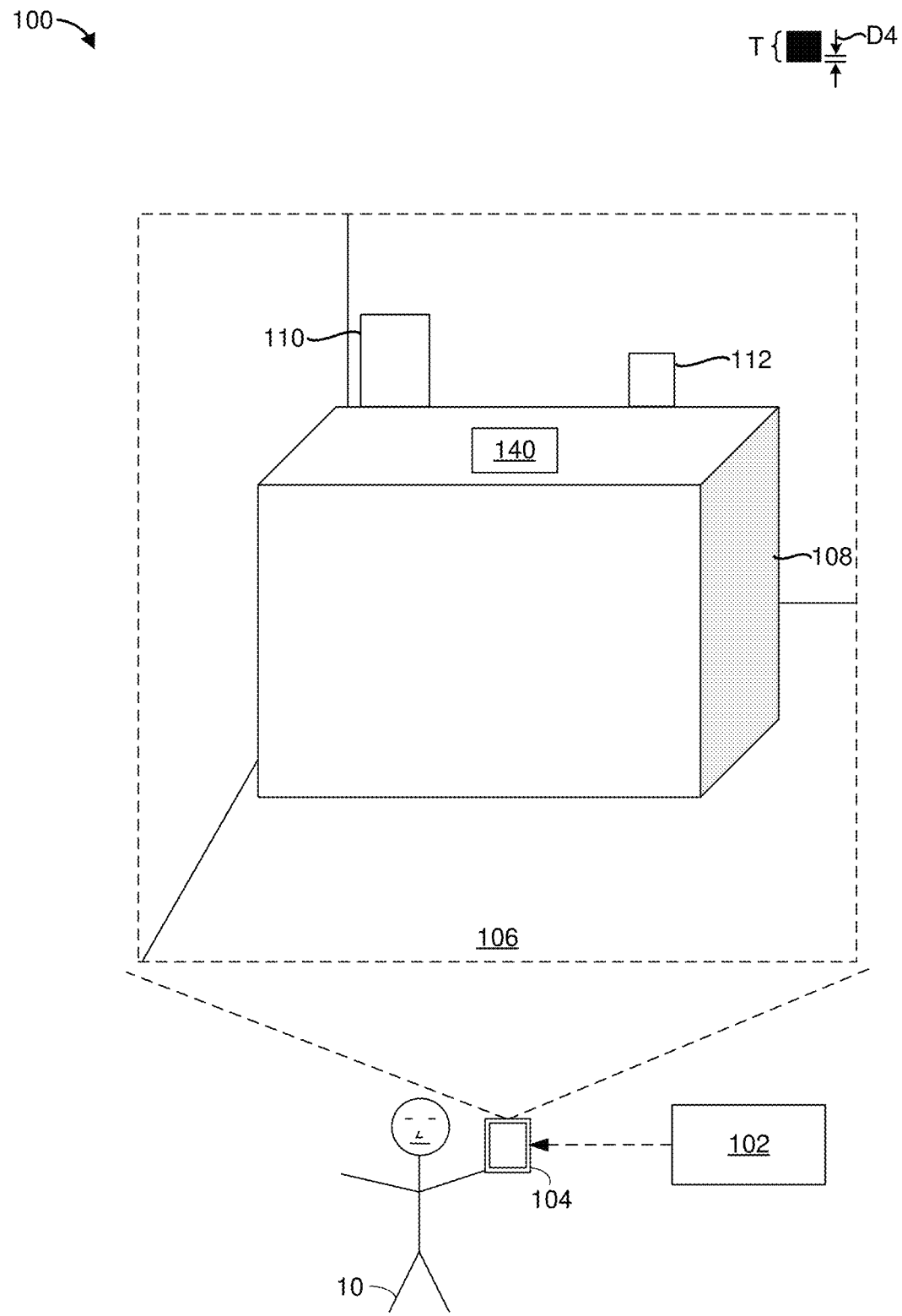

FIG. 1E illustrates the lip balm container 112 located at a distance D4 from the cereal box 108 that is less than the threshold distance T. In some implementations, when the lip balm container 112 is closer than the threshold distance T to the cereal box 108, XR content 140 is generated based on a combination of the XR content 122 and the XR content 130, as disclosed in greater detail herein. In some implementations, the XR content 140 is unrelated to the physical element. For example, if the physical element is identified as the lip balm container, the controller 102 and/or the electronic device 104 may include an XR representation of a power source, such as a battery in the XR content 140.

As illustrated in FIG. 1E, the controller 102 and/or the electronic device 104 determines that a distance D4 between the cereal box 108 and the lip balm container 112 is within (e.g., less than or equal to) the threshold distance T. In some implementations, the controller 102 and/or the electronic device 104 obtain environmental data (e.g., including depth data, image data, and/or a video) to make this determination.

In some implementations, a head-mountable device (HMD), being worn by the user 10, presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 104 can be attached to the head-mountable enclosure. In various implementations, the head-mountable enclosure is shaped to form a receptacle for receiving another device that includes a display (e.g., the electronic device 104). For example, in some implementations, the electronic device 104 slides/snaps into or otherwise attaches to the head-mountable enclosure. In some implementations, the display of the device attached to the head-mountable enclosure presents (e.g., displays) the XR environment 106. In various implementations, examples of the electronic device 104 include smartphones, tablets, media players, laptops, etc.

Figure 2:
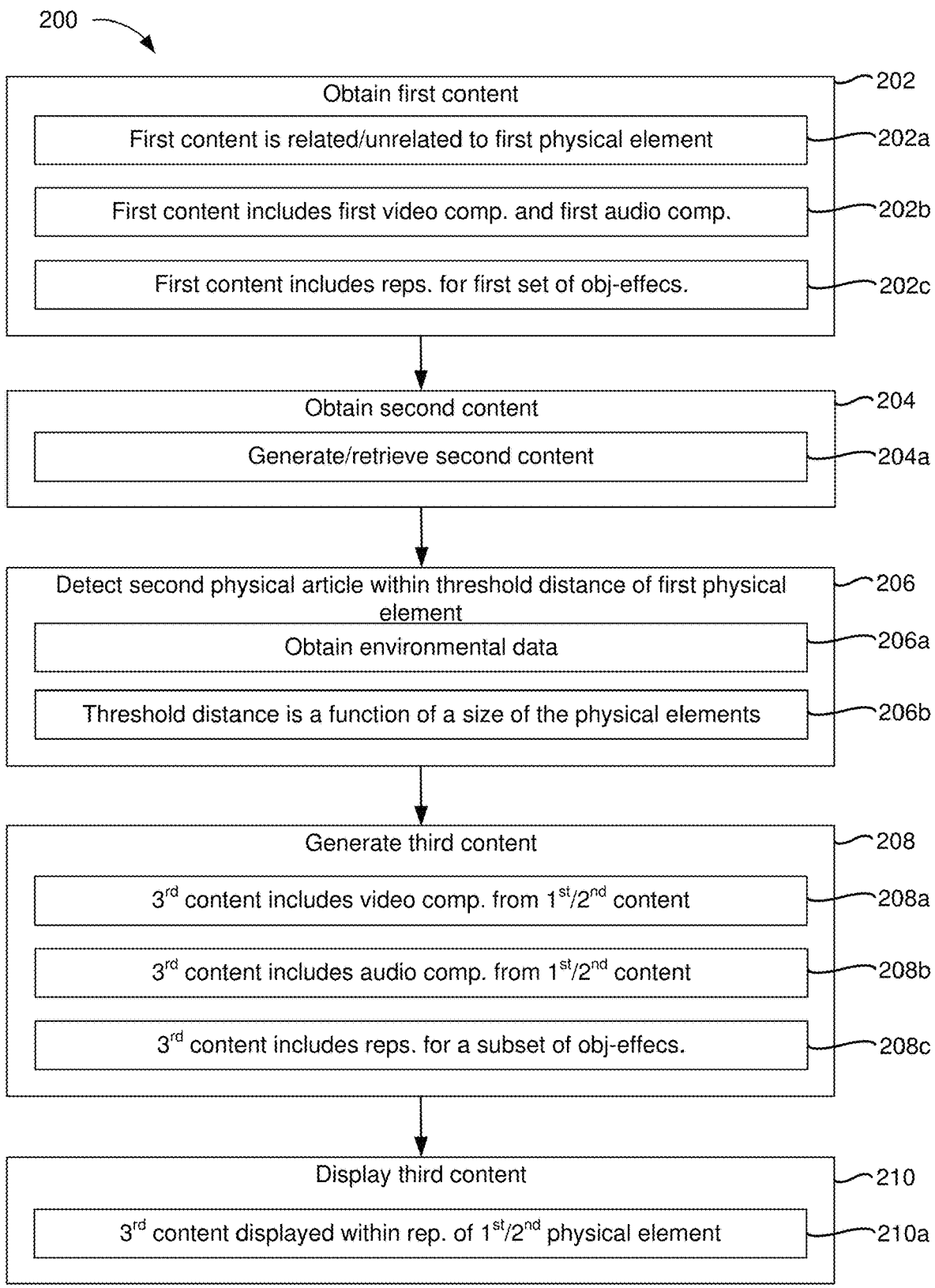
FIG. 2 is a flowchart representation of a method of generating content in accordance with some implementations.

FIG. 2 is a flowchart representation of a method 200 of generating XR content in accordance with some implementations. In various implementations, the method 200 is performed by a device with a non-transitory memory and one or more processors coupled with the non-transitory memory (e.g., the controller 102 and/or the electronic device 104 shown in FIG. 1A). In some implementations, the method 200 is performed by processing logic, which may include hardware, firmware, software, or a combination thereof. In some implementations, the method 200 is performed by a processor executing code stored in a non-transitory computer-readable medium, e.g., a memory.

As represented by block 202, in some implementations, the method 200 includes obtaining (e.g., retrieving, synthesizing, or generating) a first XR content in response to identifying a first physical element of a first object type. For example, in some implementations, the method 200 includes retrieving the first XR content from a content datastore. In some implementations, the method 200 includes synthesizing the first XR content based on one or more characteristics (e.g., physical characteristics, chemical characteristics, electrical characteristics, structural characteristics, functional characteristics, etc.) of the physical element. In some implementations, the method 200 includes generating the first XR content based on one or more characteristics of the physical element.

For example, as shown in FIG. 1A, the controller 102 and/or the electronic device 104 identifies a cereal box. In some implementations, the controller 102 and/or the electronic device 104 identifies the cereal box based on environmental data corresponding to a physical environment. The environmental data may include, for example, depth information, image data, and/or a video. In some implementations, in response to identifying the cereal box, the controller 102 and/or the electronic device 104 displays the XR representation of the cereal box 108 and obtains XR content 118.

As represented by block 202a, in some implementations, the first XR content is related to the first physical element. For example, the XR content 118 may be related to a real cereal box represented by the XR cereal box 108 (e.g., the XR content 118 may include a video provided by a manufacturer of the cereal). In some implementations, the method 200 includes obtaining the first XR content based on one or more characteristics of the physical element. For example, in some implementations, the method 200 includes determining a set of characteristics of the physical element, utilizing the set of characteristics to form a search query for an XR content datastore, and receiving the first XR content as a search result (e.g., if the cereal in the cereal box is in the shape of animal characters, then receiving XR representations of animals). In some implementations, the method 200 includes providing the set of characteristics as input to a neural network system that generates the first XR content.

As shown in block 202b, in some implementations, the first XR content includes a video component and/or an audio component. In some implementations, the method 200 includes obtaining the video component and the audio component from different sources. For example, in some implementations, the method 200 includes obtaining the video component from a video content store and the audio component from a music streaming service.

As shown in block 202c, the first XR content includes XR representations for a first set of objective-effectuators. In some implementations, the first set of objective-effectuators represent items within the first physical element. For example, each of the first set of objective-effectuators includes a character objective-effectuator that represents a piece of cereal in the cereal box. For example, if some pieces of cereal in the cereal box are in the shape of an animal, then at least some of the first set of objective-effectuators model behavior of the animal.

As represented by block 204, in some implementations, the controller 102 and/or the electronic device 104 obtains a second XR content in response to identifying a second physical element of a second object type. For example, in some implementations, the method 200 includes retrieving the second XR content from a content datastore. In some implementations, the method 200 includes synthesizing the second XR content based on one or more characteristics (e.g., physical characteristics, chemical characteristics, electrical characteristics, structural characteristics, functional characteristics, etc.) of the physical element. In some implementations, the method 200 includes generating the second XR content based on one or more characteristics of the physical element.

For example, as shown in FIG. 1B, the controller 102 and/or the electronic device 104 obtains the XR content 120 in response to identifying a physical dental floss container represented by the XR dental floss container 110. In some implementations, the controller 102 and/or the electronic device 104 identifies the dental floss container, for example, based on environmental data corresponding to a physical environment. The environmental data may include, e.g., depth information, photographic information, and/or video information. In some implementations, the method 200 includes obtaining the environmental data using an environmental sensor. In some implementations, the environmental sensor is or includes, for example, a camera or a depth sensor.

Based on this identification, the controller 102 and/or the electronic device 104 may generate the XR content 120, as shown at block 204a. In some implementations, the controller 102 and/or the electronic device 104 retrieves the XR content 120 from a data store based on this identification. In some implementations, the XR content 120 is related to the dental floss container 110. In some implementations, the XR content 120 is unrelated to the dental floss container 110. In some implementations, the XR content 120 is obtained based on a property (e.g., a physical, chemical, electrical, structural, or functional property) of the dental floss container 110.

In some implementations, as shown in FIG. 1B, the controller 102 and/or the electronic device 104 determines that a distance D1 between the cereal box 108 and the dental floss container 110 is greater than a threshold distance T. In some implementations, the controller 102 and/or the electronic device 104 obtain environmental data (e.g., including depth information, photographic information, and/or video information) to make this determination. The threshold distance T may be a fixed distance. The threshold distance T may vary or may be selected based on the size of the first physical element or the second physical element. For example, the threshold distance T may be a percentage of the size of the first physical element or a percentage of the size of the second physical element.

As represented by block 206, in some implementations, the controller 102 and/or the electronic device 104 detect that the second physical element is within a threshold distance of the first physical element. For example, in some implementations, the controller 102 and/or the electronic device 104 determines that a distance D2 between the cereal box 108 and the dental floss container 110 is within (e.g., less than or equal to) the threshold distance T, as shown in FIG. 1C.

As represented by block 206a, in some implementations, the controller 102 and/or the electronic device 104 obtain environmental data to make this determination. The environmental data may include, for example, depth information, image data, and/or a video. In some implementations, the threshold distance T is a fixed distance.

As represented by block 206b, the threshold distance T may vary or may be selected based on the size of the first physical element or the second physical element. For example, the threshold distance T may be a percentage of the size of the first physical element or a percentage of the size of the second physical element.

As represented by block 208, in some implementations, the method 200 includes generating third XR content based on a combination of the first XR content and the second XR content. The third XR content may be associated with a third object type. The third object type may be different from the first object type and/or the second object type. In some implementations, the third XR content may include a portion of the first XR content that may be selected based on one or more properties associated with the first object type. The third XR content may include a portion of the second XR content that may be selected based on one or more properties associated with the second object type. For example, in some implementations, in response to determining that the first physical element (e.g., the cereal box 108) and the second physical element (e.g., the dental floss container 110) are within the threshold distance T of one another, the controller 102 and/or the electronic device 104 generates XR content 130, as shown in FIG. 1C.

In some implementations, the XR content 130 is related to the XR content 118 and/or the XR content 120. For example, the controller 102 and/or the electronic device 104 may obtain (e.g., retrieve, synthesize, or generate) XR ropes extending from an XR representation of the cereal box 108. In some implementations, the XR content 130 is retrieved from a content datastore. In some implementations, the XR content 130 is synthesized based on one or more characteristics (e.g., physical characteristics, chemical characteristics, electrical characteristics, structural characteristics, functional characteristics, etc.) of the physical element. In some implementations, the XR content 130 is generated based on one or more characteristics of the physical element. In some implementations, the XR environment 106 may include objective-effectuators that represent characters from different fictional materials (e.g., movies, TV shows, games, comics, and/or novels). In various implementations, the objective-effectuators may represent (e.g., model behavior of) tangible objects. For example, in some implementations, the objective-effectuators may represent equipment (e.g., machinery such as planes, tanks, robots, cars, etc.). In some implementations, the objective-effectuators may model behavior of (e.g., represent) fictional entities (e.g., things such as equipment from fictional materials). In some implementations, the objective-effectuators may model entities from physical entities (e.g., the objective-effectuators may represent things from the real-world), including entities located inside and/or outside of the XR environment 106. In some implementations, XR content may be related to an objective for an objective-effectuator.

In various implementations, the objective-effectuators perform one or more actions in order to effectuate (e.g., complete, satisfy, and/or achieve) one or more objectives. In some implementations, the objective-effectuators perform a sequence of actions. In some implementations, the controller 102 and/or the electronic device 104 determine the actions that the objective-effectuators are to perform. In some implementations, the actions of the objective-effectuators are within a degree of similarity to actions that the entities (e.g., characters or things) corresponding to the objective-effectuators may perform in the fictional material from which the objective-effectuators are derived. In some implementations, an objective-effectuator is associated with a particular objective, and the objective-effectuator may perform actions that may improve the likelihood of satisfying that particular objective.

In some implementations, the objective-effectuators may be referred to as object representations, for example, because the objective-effectuators may represent various objects (e.g., real-world objects, or fictional objects). In some implementations, an objective-effectuator representing a character may be referred to as a character objective-effectuator. In some implementations, a character objective-effectuator may perform actions to effectuate a character objective. In some implementations, an objective-effectuator representing an equipment may be referred to as an equipment objective-effectuator. In some implementations, an equipment objective-effectuator may perform actions to effectuate an equipment objective. In some implementations, an objective-effectuator representing an environment may be referred to as an environmental objective-effectuator. In some implementations, an environmental objective-effectuator may perform environmental actions to effectuate an environmental objective. In some implementations, XR content is related to an action for an objective-effectuator.

The third XR content may include a mixture of audio and/or video from the first XR content and/or the second XR content. In some implementations, as represented in block 208a, the third XR content includes a video component from the first XR content and/or the second XR content. In some implementations, as represented in block 208b, the third XR content includes an audio component from the first XR content and/or the second XR content. For example, the third XR content may include audio from the first XR content and video from the second XR content. As another example, the third XR content may include video from the first XR content and audio from the second XR content.

In some implementations, as represented in block 208c, the third XR content includes XR representations for a subset of objective-effectuators. For example, in some implementations, the third XR content is generated at least in part by importing one or more objective-effectuators from one XR content into another XR content. One or more objective-effectuators may be imported from the first XR content into the second XR content. As another example, one or more objective-effectuators may be imported from the second XR content into the first XR content. Any imported objective-effectuators may interact with objective-effectuators in the XR content into which they are imported. For example, objective-effectuators imported from the second XR content may interact with objective-effectuators in the first XR content. Similarly, objective-effectuators imported from the first XR content may interact with objective-effectuators in the second XR content.

As represented by block 210, in some implementations, the method 200 includes displaying the third XR content. The third XR content may be displayed, for example, using a display that may be integrated as part of the electronic device 104. For example, the user 10 may be able to see content displayed on the display forming part of the electronic device 104. The third XR content may include virtual reality content, mixed reality content, or both. In some implementations, the third XR content may be displayed using an external display.

As represented by block 210a, in some implementations, the third XR content is displayed within a boundary of the first physical element (e.g., the cereal box 108) and/or the second physical element (e.g., the dental floss container 110 or the lip balm container 112), e.g., within a boundary of an XR representation of the first physical element and/or the second physical element.

In some implementations, the method 200 includes detecting a user input interacting with a portion of the third XR content, and displaying a manipulation of the portion of the third XR content in response to detecting the user input.

In some implementations, the method 200 includes compositing an affordance in association with a portion of the third XR content. In some implementations, the affordance allows manipulation of the portion of the third XR content. In some implementations, the method 200 includes detecting an input directed to the affordance. In some implementations, the method 200 includes displaying a manipulation of the portion of the third XR content in response to detecting the input directed to the affordance. In some implementations, the affordance includes at least one of a visible affordance, an invisible affordance, an opaque affordance, a translucent affordance, or a transparent affordance.

In some implementations, the portion of the third XR content includes an XR representation of an objective-effectuator. In some implementations, displaying the manipulation of the portion of the third XR content includes animating the XR representation of the objective-effectuator in order to provide an appearance that the XR representation of the objective-effectuator is performing an action.

In some implementations, the portion of the third XR content includes an XR object. In some implementations, displaying the manipulation of the portion of the third XR content comprises moving the XR object (e.g., from a first display location to a second display location) or changing a state of the XR object (e.g., switching between an open state and a closed state).

It should be understood that the particular order in which the operations in FIG. 2 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 500) are also applicable in an analogous manner to method 200 described above with respect to FIG. 2. For example, the first XR content, the second XR content, the third XR content, etc., described above with reference to method 200 optionally have one or more of the characteristics of the XR content, the affordance, the input and the manipulation, etc. described herein with reference to other methods described herein (e.g., method 500). For brevity, these details are not repeated here.

Figure 3:
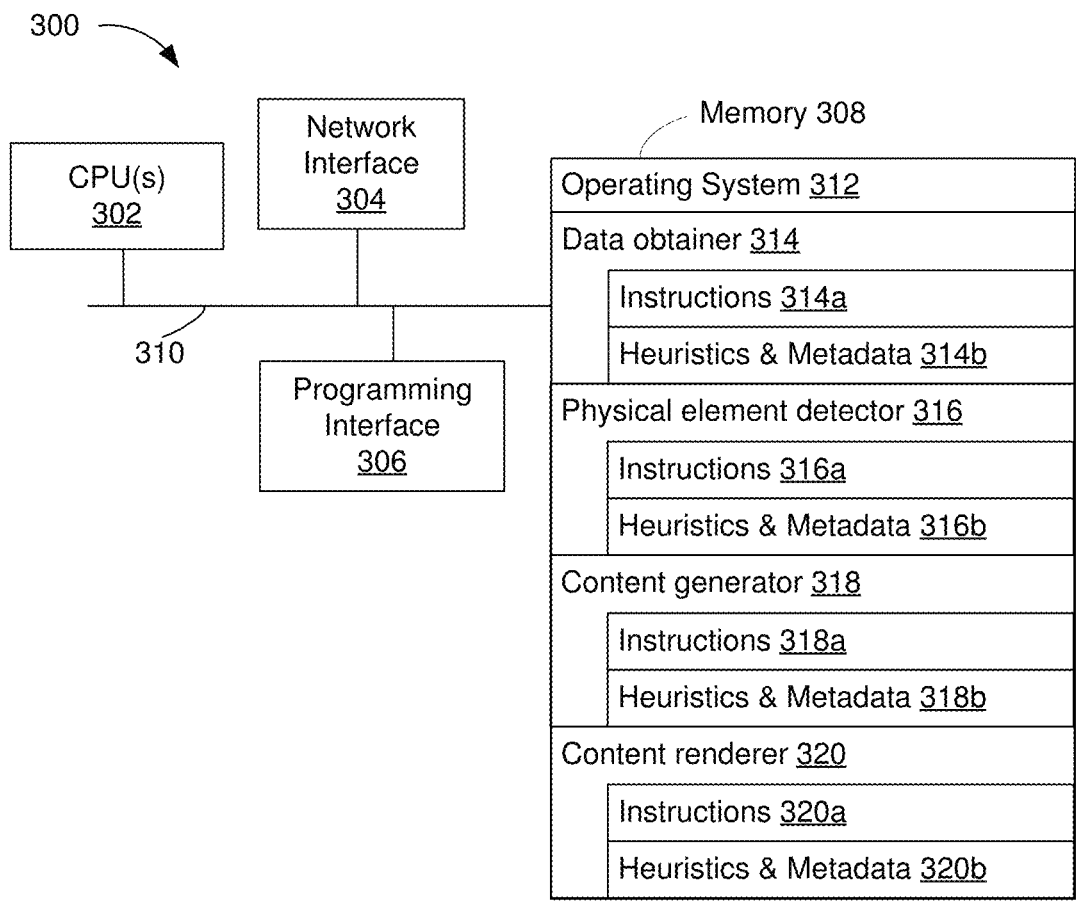
FIG. 3 is a block diagram of a device enabled with various components for generating content in accordance with some implementations.

FIG. 3 is a block diagram of a device 300 (e.g., a server system) in accordance with some implementations. In some implementations, the device 300 implements the controller 102 and/or the electronic device 104 shown in FIG. 1A. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the device 300 includes one or more processing units (CPUs) 302, a network interface 304, a programming interface 306, a memory 308, and one or more communication buses 310 for interconnecting these and various other components.

In some implementations, the network interface 304 is provided to, among other uses, establish and maintain a metadata tunnel between a cloud hosted network management system and at least one private network including one or more compliant devices. In some implementations, the one or more communication buses 310 include circuitry that interconnects and controls communications between system components. The memory 308 may include high-speed random access memory, such as DRAM, SRAM, DDR RAM, and/or other random access solid state memory devices, and may include non-volatile memory, such as one or more magnetic disk storage devices, optical disk storage devices, flash memory devices, and/or other non-volatile solid state storage devices. The memory 308 may include one or more storage devices remotely located from the one or more CPUs 302. The memory 308 may include a non-transitory computer readable storage medium.

In some implementations, the memory 308 or the non-transitory computer readable storage medium of the memory 308 may store one or more of the following programs, modules and data structures, or a subset thereof, which may include an operating system 312, a data obtainer 314, a physical element detector 316, an XR content generator 318, and/or an XR content renderer 320. The data obtainer 314 may include instructions 314a and/or heuristics and metadata 314b for obtaining data, for example, from an environmental sensor. The physical element detector 316 may include instructions 316a and/or heuristics and metadata 316b for detecting physical elements based on the obtained data. The XR content generator 318 may include instructions 318a and/or heuristics and metadata 318b for generating XR content based on the detected physical elements. The XR content renderer 320 may include instructions 320a and/or heuristics and metadata 320b for displaying or rendering the generated XR content.

In various implementations, the device 300 performs the method 200 shown in FIG. 2. In some implementations, the data obtainer 314 performs the operations described with respect to blocks 202 and 204 shown in FIG. 2. In some implementations, the physical element detector 316 performs the operations described with respect to block 206 shown in FIG. 2. In some implementations, the XR content generator 318 performs the operations described with respect to block 208 shown in FIG. 2. In some implementations, the XR content renderer 320 performs the operations described with respect to block 210.

Figure 4A:
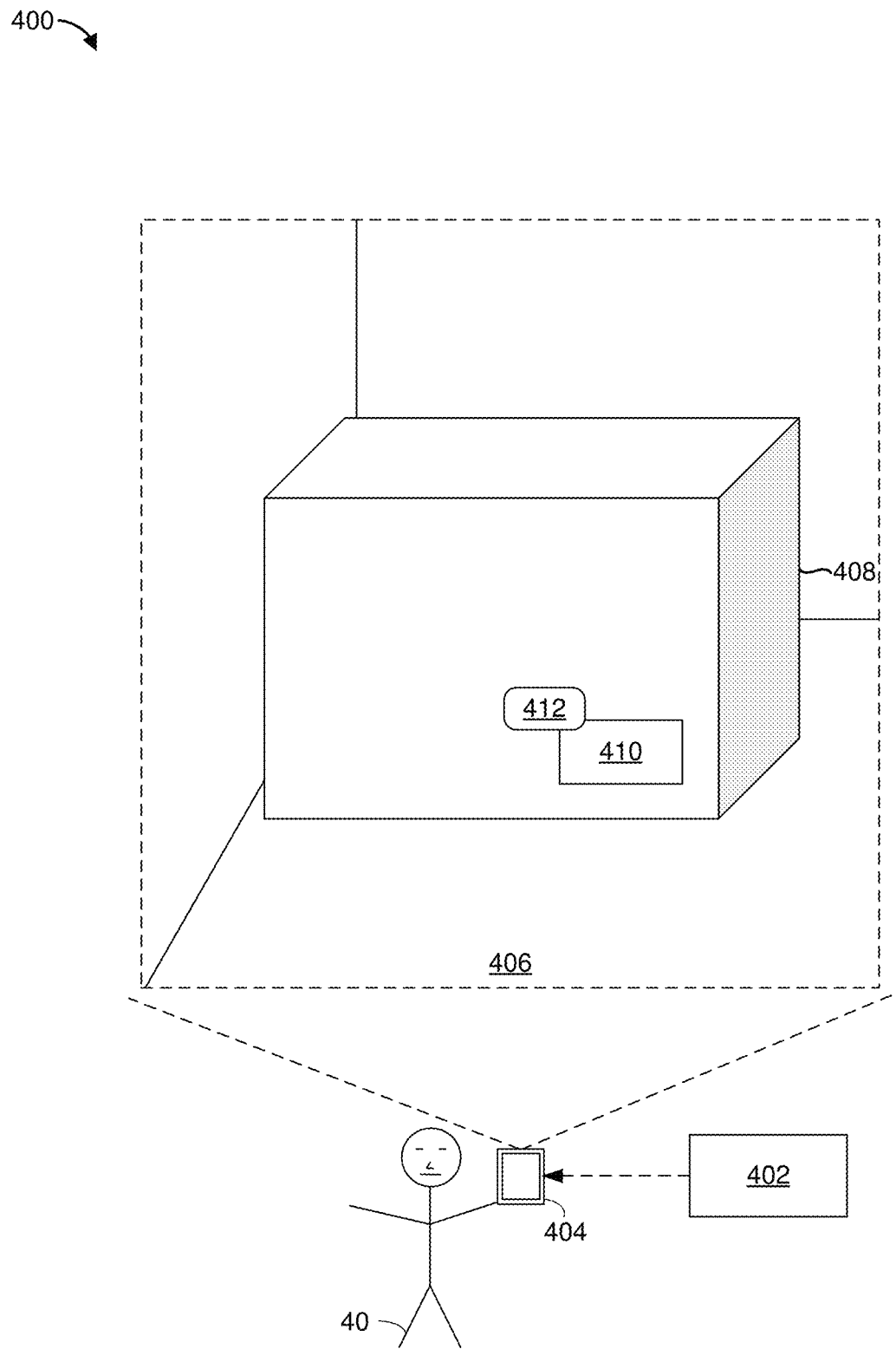
FIGS. 4A-4C are block diagrams of an example operating environment in accordance with some implementations.
Figure 4B:
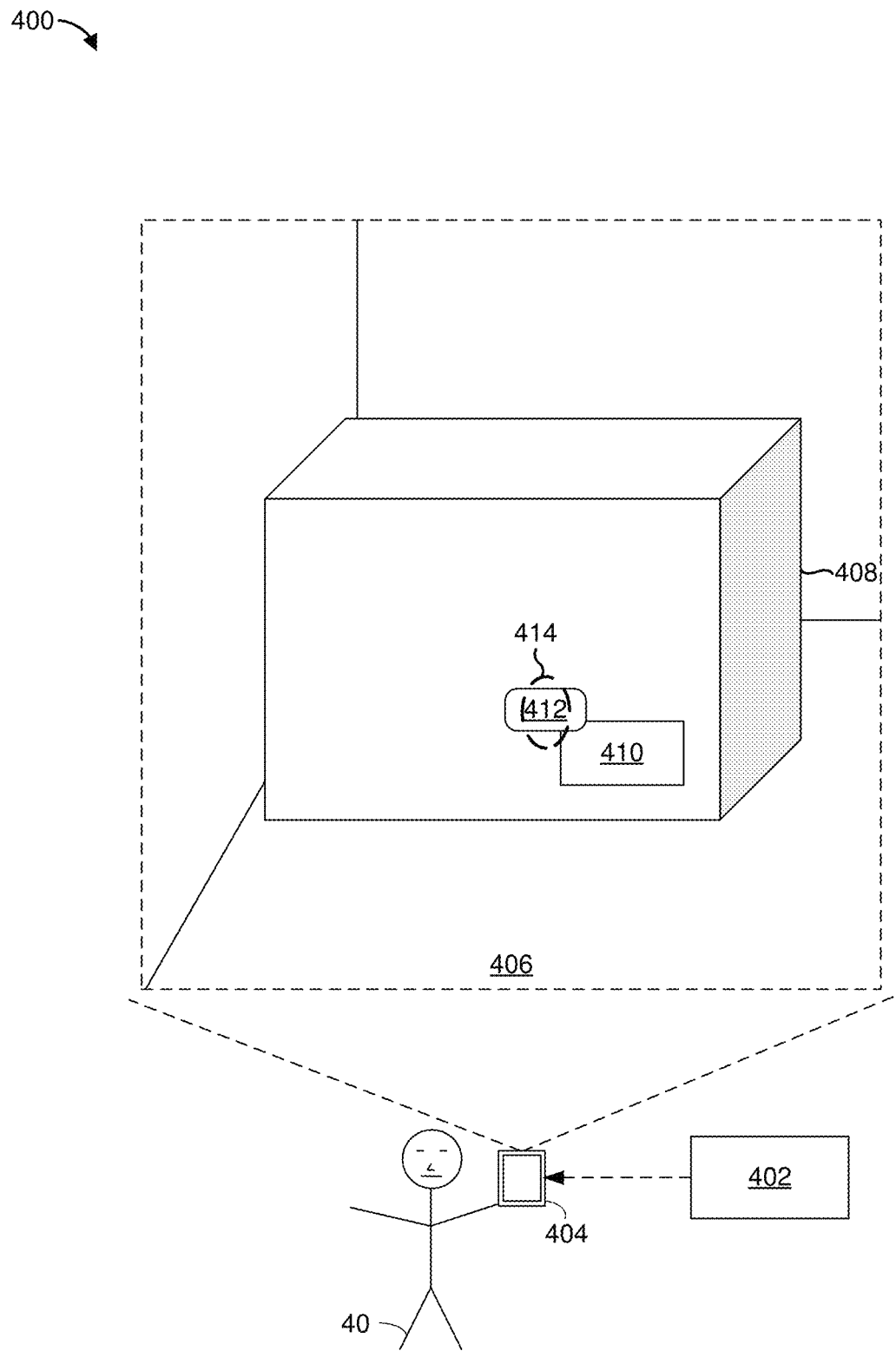
Figure 4C:
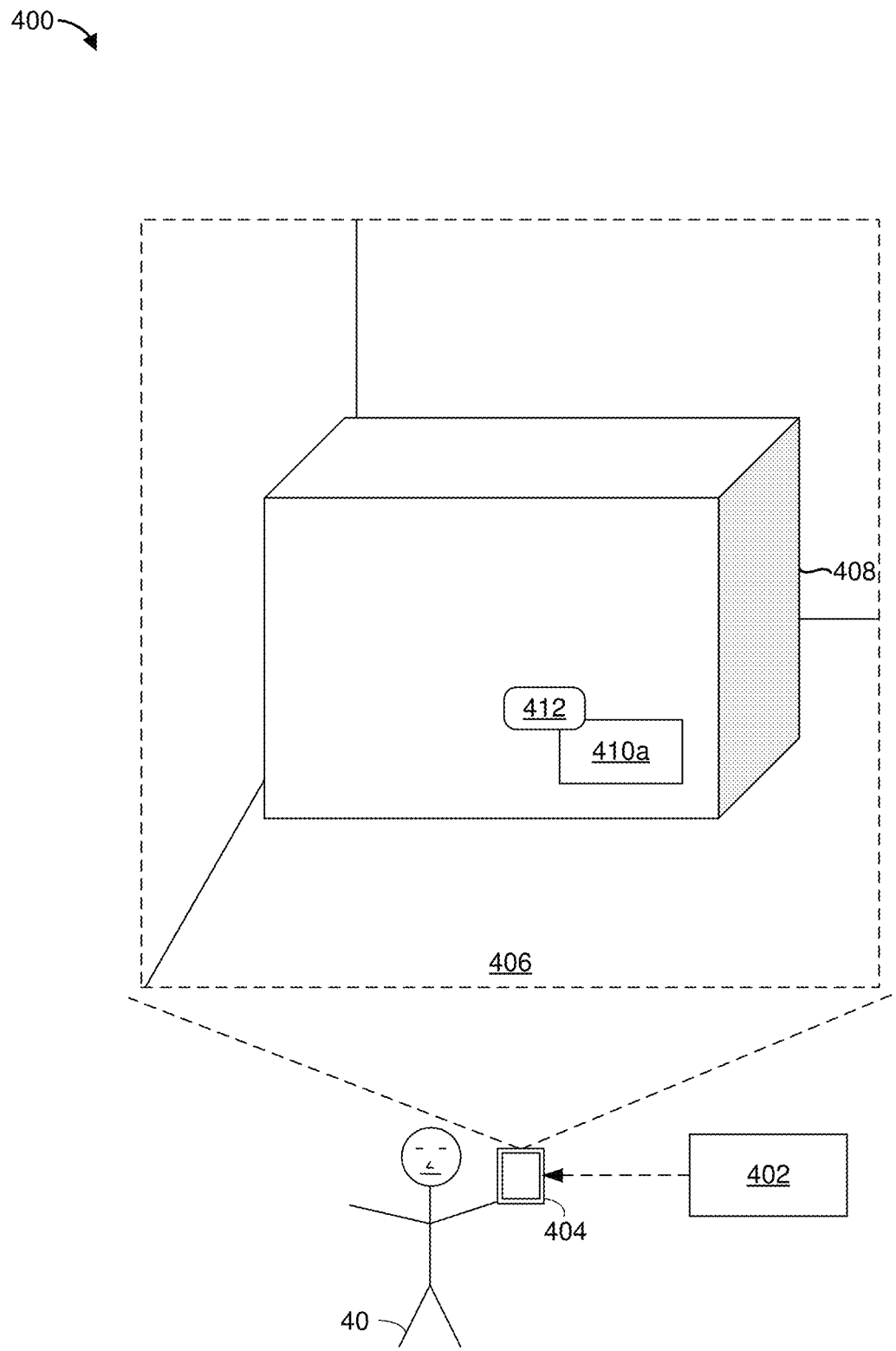

FIGS. 4A-4C are block diagrams of an example operating environment 400 in accordance with some implementations. The operating environment 400 may include a controller 402 and an electronic device 404. In some implementations, the electronic device 404 includes a smartphone, a tablet, a laptop, or the like. In some implementations, the electronic device 404 includes a head-mountable device (HMD). The electronic device 404 may be carried by or worn by a user 40.

As illustrated in FIGS. 4A-4C, in various implementations, the electronic device 404 presents an XR environment 406. In some implementations, the XR environment 406 is generated by the controller 402 and/or the electronic device 404. In some implementations, the XR environment 406 includes a virtual environment that is a simulated replacement of a physical environment. For example, in some implementations, the XR environment 406 is simulated by the controller 402 and/or the electronic device 404. In some implementations, the XR environment 406 may be different from the real-world environment in which the electronic device 404 is located.

In some implementations, the XR environment 406 includes an augmented environment that is a modified version of a physical environment. For example, in some implementations, the controller 402 and/or the electronic device 404 modify (e.g., augment) a representation of the physical environment in which the electronic device 404 is located to generate the XR environment 406. In some implementations, the controller 402 and/or the electronic device 404 may generate the XR environment 406 by adding items to the representation of the physical environment in which the electronic device 404 is located.

In some implementations, the controller 402 and/or the electronic device 404 generate the XR environment 406 by simulating a replica of the real-world scene in which the electronic device 404 is located. In some implementations, the controller 402 and/or the electronic device 404 may generate the XR environment 406 by removing and/or adding items from the simulated replica of the real-world scene in which the electronic device 404 is located.

The XR environment 406 may include XR representations of real-world objects, e.g., physical elements. For example, the XR environment 406 may include an XR representation of a cereal box 408 ("XR cereal box 408", hereinafter for the sake of brevity). In some implementations, when the controller 402 and/or the electronic device 404 recognize a physical element as a cereal box, the controller 402 and/or the electronic device 404 obtain XR content 410. In some implementations, the XR content 410 includes an XR representation of the cereal box 408. The XR representation of the cereal box 408 may be rendered in a cutaway view. Rendering a cutaway view may facilitate use of the interior of the cereal box 408 in the XR environment 406. In other words, in some implementations, the XR content 410 is displayed within the XR representation of the cereal box 408. More generally, in various implementations, the XR content 410 is displayed in association with the XR representation of the cereal box 408.

As shown in FIG. 4A, an affordance 412 may be composited in association with a portion of the XR content 410. In some implementations, the affordance 412 is visible. In some implementations, the affordance 412 is invisible. In some implementations, the affordance 412 is opaque. In some implementations, the affordance 412 is translucent. In some implementations, the affordance 412 is transparent. In some implementations, the affordance 412 allows manipulation of the portion of the XR content 410.

FIG. 4B illustrates an input 414 directed to the affordance 412. In some implementations, the input 414 includes a user input that is provided by the user 40. In some implementations, the input 414 is generated by the controller 402 and/or the electronic device 404. When the controller 402 and/or the electronic device 404 detect the input 414, a manipulation of the portion of the XR content 410 may be displayed.

For example, as shown in FIG. 4C, the controller 402 and/or the electronic device 404 may display the portion of the XR content being modified or changed, as represented by a modified XR content 410a.

Figure 5:
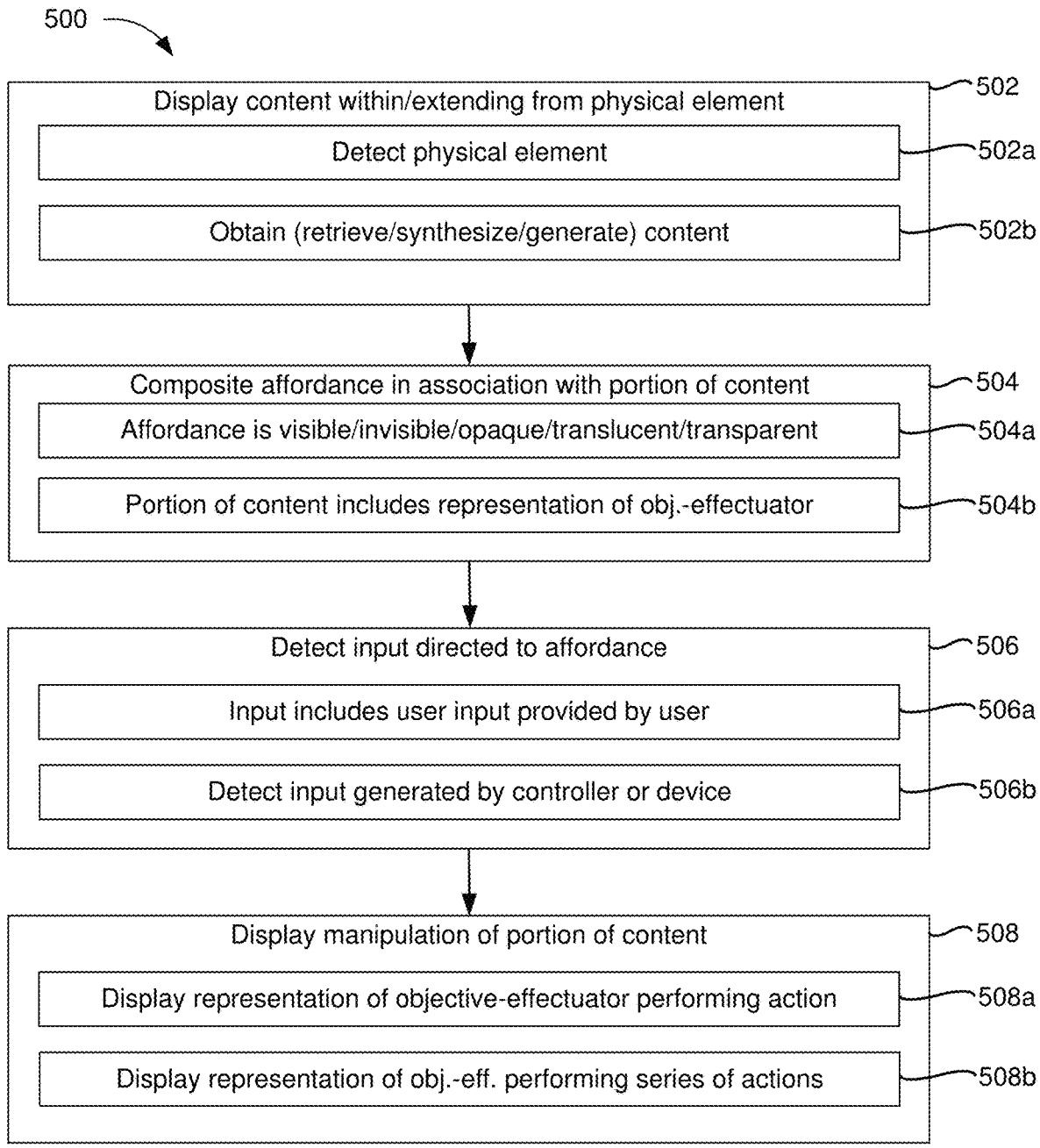
FIG. 5 is a flowchart representation of a method of generating content in accordance with some implementations.

FIG. 5 is a flowchart representation of a method 500 of displaying a manipulation of XR content in accordance with some implementations. In various implementations, the method 500 may be performed by a device with a non-transitory memory and one or more processors coupled with the non-transitory memory (e.g., the controller 402 and/or the electronic device 404 shown in FIG. 4A). In some implementations, the method 500 may be performed by processing logic, which may include hardware, firmware, software, or a combination thereof. In some implementations, the method 500 may be performed by a processor executing code that may be stored in a non-transitory computer-readable medium, e.g., a memory.

As represented by block 502, in some implementations, the method 500 includes displaying XR content within or extending from a physical element, such as the cereal box 408 of FIG. 4A, or an XR representation of a physical element. In some implementations, the method 500 includes displaying an XR representation of the physical element. The XR content may be displayed wholly or partially within a boundary of the XR representation of the physical element.

As represented by block 502a, in some implementations, the method 500 includes detecting the physical element. For example, in some implementations, the controller 402 and/or the electronic device 404 recognizes the physical element as the cereal box 408 based on environmental data corresponding to a physical environment. The environmental data may include, for example, depth information, image data, and/or a video. In some implementations, the method 500 includes obtaining the environmental data using an environmental sensor. The environmental sensor may be or may include, for example, a camera or a depth sensor.

As represented by block 502b, in some implementations, the method 500 includes obtaining the XR content. Obtaining XR content may include retrieving, synthesizing, or generating XR content. For example, in some implementations, the XR content is retrieved from a content datastore. In some implementations, the XR content is synthesized based on one or more characteristics (e.g., physical characteristics, chemical characteristics, electrical characteristics, structural characteristics, functional characteristics, etc.) of the physical element. In some implementations, the XR content is generated based on one or more characteristics of the physical element. As illustrated in FIG. 4A, the controller 402 and/or the electronic device 404 may obtain XR content 410.

As represented by block 504, in some implementations, the method 500 includes compositing the affordance 412 in association with a portion of the XR content. The affordance 412 may allow manipulation of the portion of the XR content. As represented by block 504a, in some implementations, the affordance 412 is visible. In some implementations, the affordance 412 is invisible. In some implementations, the affordance 412 is opaque. In some implementations, the affordance 412 is translucent. In some implementations, the affordance 412 is transparent.

In some implementations, as represented by block 504b, the portion of the XR content includes an XR representation of an objective-effectuator, such as, for example, a character objective-effectuator, an equipment objective-effectuator, and/or an environmental objective-effectuator. Activating the affordance may trigger the XR representation of the objective-effectuator to perform an action. The action may improve the likelihood of satisfying a particular objective that may be associated with the objective-effectuator. The action may be within a degree of similarity to actions that an entity (e.g., a character or a thing) corresponding to the objective-effectuator may perform in the fictional material from which the objective-effectuator is derived.

As represented by block 506, in some implementations, the method 500 includes detecting the input 414 directed to the affordance. In some implementations, as represented by block 506a, the input 414 includes a user input that is provided by the user 40. For example, the user 40 may click on or otherwise select or interact with the affordance 412. In some implementations, as represented by block 506b, the method 500 includes detecting an input generated by the controller 402 and/or the electronic device 404.

As represented by block 508, in some implementations, the method 500 includes displaying a manipulation of the portion of the XR content in response to detecting this input. For example, as represented by block 508a, the affordance may be visible, and the controller 402 and/or the electronic device 404 may display an XR representation of an objective-effectuator, e.g., an XR avatar of a person, performing an action, e.g., activating the affordance. As another example, the controller 402 and/or the electronic device 404 may display the portion of the XR content being modified or changed, as represented by the modified XR content 410a of FIG. 4C.

In some implementations, as represented by block 508b, the method 500 includes displaying an XR representation of an objective-effectuator performing a series of actions. In some implementations, the controller 402 and/or the electronic device 404 may determine the actions that the objective-effectuators are to perform. In some implementations, the actions of the objective-effectuators may be within a degree of similarity to actions that the characters or things corresponding to the objective-effectuators may perform in the fictional material from which the objective-effectuators are derived. In some implementations, an objective-effectuator may be associated with a particular objective, and the objective-effectuator may perform actions that may improve the likelihood of satisfying that particular objective.

In some implementations, the portion of the XR content includes an XR object. In some implementations, displaying the manipulation of the portion of the XR content includes displaying a movement of the XR object from a first display location to a second display location.

In some implementations, the portion of the XR content includes an XR object. In some implementations, displaying the manipulation of the portion of the XR content includes displaying a change in the XR object from a first state to a second state (e.g., switching between an open state and a closed state).

In some implementations, detecting the input includes detecting that an XR representation of a user has activated the affordance.

In some implementations, detecting the input includes detecting that an XR representation of an objective-effectuator has activated the affordance. For example, in some implementations, detecting the input includes detecting that an XR character has activated the affordance without an explicit command from the user.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 200) are also applicable in an analogous manner to method 500 described above with respect to FIG. 5. For example, the XR content, the affordance, the input and the manipulation, etc., described above with reference to method 500 optionally have one or more of the characteristics of the first XR content, the second XR content, the third XR content, etc. described herein with reference to other methods described herein (e.g., method 200). For brevity, these details are not repeated here.

Figure 6:
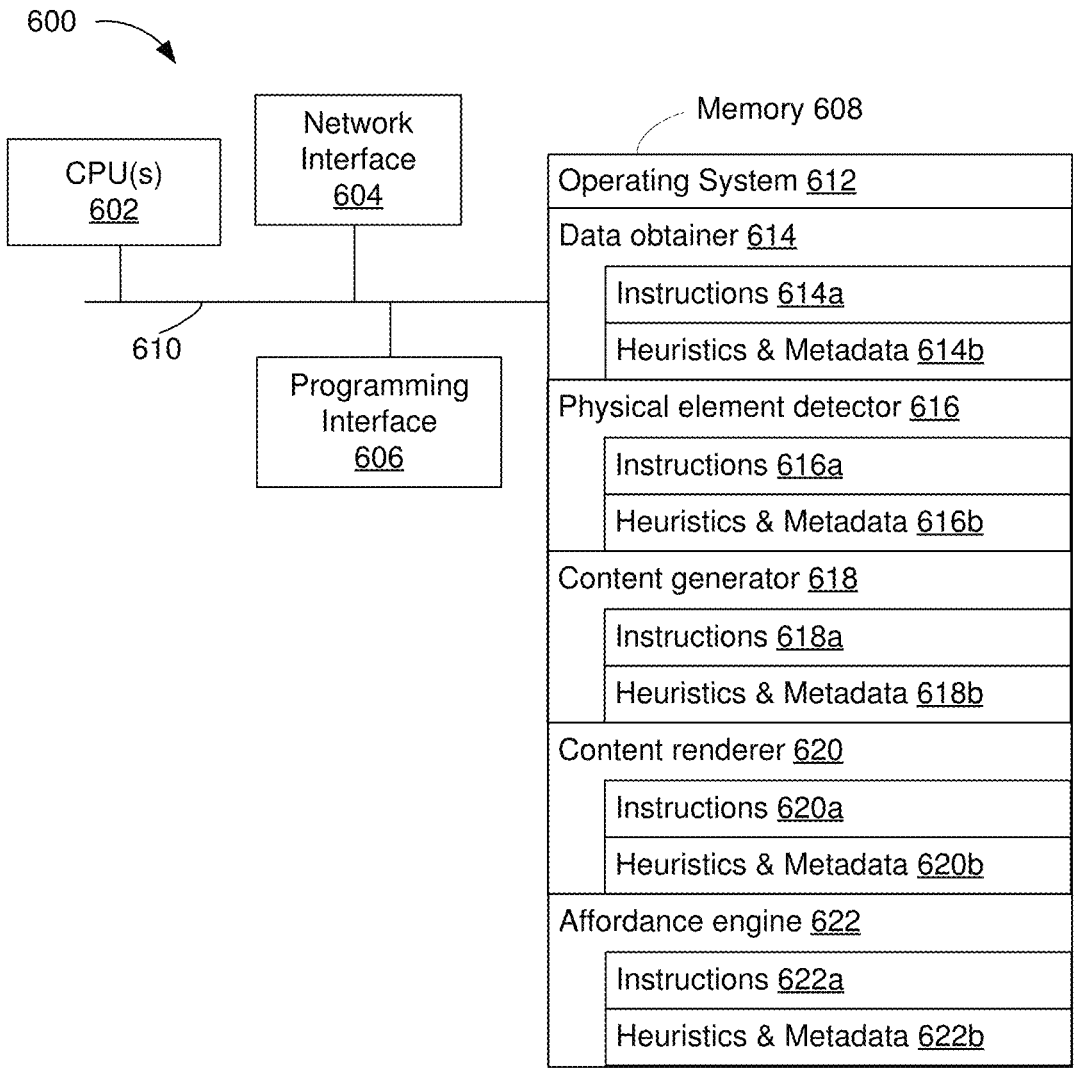
FIG. 6 is a block diagram of a device enabled with various components for generating content in accordance with some implementations.

FIG. 6 is a block diagram of a device 600 (e.g., a server system) in accordance with some implementations. In some implementations, the device 600 implements the controller 402 and/or the electronic device 404 shown in FIG. 4. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 600 may include one or more processing units (CPUs) 602, a network interface 604, a programming interface 606, a memory 608, and one or more communication buses 610 for interconnecting these and various other components.

In some implementations, the network interface 604 may be provided to, among other uses, establish and maintain a metadata tunnel between a cloud hosted network management system and at least one private network including one or more compliant devices. In some implementations, the one or more communication buses 610 may include circuitry that interconnects and controls communications between system components. The memory 608 may include high-speed random access memory, such as DRAM, SRAM, DDR RAM, and/or other random access solid state memory devices, and may include non-volatile memory, such as one or more magnetic disk storage devices, optical disk storage devices, flash memory devices, and/or other non-volatile solid state storage devices. The memory 608 may include one or more storage devices remotely located from the one or more CPUs 602. The memory 608 may include a non-transitory computer readable storage medium.

In some implementations, the memory 608 or the non-transitory computer readable storage medium of the memory 608 may store one or more of the following programs, modules and data structures, or a subset thereof, which may include an operating system 612, a data obtainer 614, a physical element detector 616, an XR content generator 618, an XR content renderer 620, and/or an affordance engine 622. The data obtainer 614 may include instructions 614*a* and/or heuristics and metadata 614*b* for obtaining data, for example, from an environmental sensor. The physical element detector 616 may include instructions 616*a* and/or heuristics and metadata 616*b* for detecting physical elements based on the obtained data. The XR content generator 618 may include instructions 618*a* and/or heuristics and metadata 618*b* for generating XR content based on the detected physical elements. The XR content renderer 620 may include instructions 620*a* and/or heuristics and metadata 620*b* for displaying or rendering the generated XR content. The affordance engine 622 may include instructions 622*a* and/or heuristics and metadata 622*b* for compositing an affordance and/or detecting an input directed to an affordance.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including an environmental sensor, a display, a non-transitory memory, and one or more processors coupled with the non-transitory memory:
   obtaining first content in response to identifying a first physical element of a first object type, wherein the first content is associated with the first object type and the first content includes representations of a first set of virtual objects that models behavior of a first set of entities;
   obtaining second content in response to identifying a second physical element of a second object type, wherein the second content is associated with the second object type and the second content includes representations of a second set of virtual objects that models behavior of a second set of entities;
   detecting that the second physical element is within a threshold distance of the first physical element;
   generating third content by importing a subset of the second set of the virtual objects from the second content into the first content; and
   displaying the third content on the display.

2. The method of claim 1, further comprising obtaining environmental data corresponding to a physical environment from the environmental sensor.

3. The method of claim 2, wherein the environmental data comprises at least one of depth information, photographic information, or video information.

4. The method of claim 1, wherein the environmental sensor comprises at least one of a camera or a depth sensor.

5. The method of claim 1, wherein the first content is related to the first physical element.

6. The method of claim 1, wherein the first content is related to at least one of a physical property, a chemical property, an electrical property, a structural property, or a functional property of the first physical element.

7. The method of claim 1, wherein the first content is unrelated to the first physical element.

8. The method of claim 1, wherein the threshold distance is a function of a size of the first physical element.

9. The method of claim 1, wherein the first content comprises a first video component and a first audio component, wherein the second content comprises a second video component and a second audio component, and wherein the third content comprises at least one of the first video component or the second video component and at least one of the first audio component or the second audio component.

10. The method of claim 1, further comprising displaying the third content within a boundary of at least one of the first physical element or the second physical element.

11. The method of claim 1, further comprising:
    detecting a user input interacting with a portion of the third content; and
    displaying a manipulation of the portion of the third content in response to detecting the user input.

12. The method of claim 11, wherein detecting the user input interacting with the portion of the third content comprises:
    compositing an affordance in association with the portion of the third content, wherein the affordance allows manipulation of the portion of the third content; and
    detecting an input directed to the affordance; and
    wherein displaying the manipulation of the portion of the third content comprises displaying the manipulation of the portion of the third content in response to detecting the input directed to the affordance.

13. The method of claim 12, wherein the affordance comprises at least one of a visible affordance, an invisible affordance, an opaque affordance, a translucent affordance, or a transparent affordance.

14. The method of claim 1, wherein the virtual objects in the first set of virtual objects represent respective physical components of the first physical element; and
    wherein the first set of entities that the first set of virtual objects model are selected based on respective shapes of the physical components.

15. The method of claim 1, wherein a first virtual object in the first set of virtual objects represents a fictional character depicted in a fictional material and the first virtual object models a behavior of the fictional character depicted in the fictional material.

16. A device comprising:
    one or more processors;
    a non-transitory memory;
    one or more displays; and
    one or more programs stored in the non-transitory memory, which, when executed by the one or more processors, cause the device to:
    obtain first content in response to identifying a first physical element of a first object type, wherein the first content is associated with the first object type and the first content includes representations of a first set of virtual objects that models behavior of a first set of entities;
    obtain second content in response to identifying a second physical element of a second object type, wherein the second content is associated with the second object type and the second content includes representations of a second set of virtual objects that models behavior of a second set of entities;
    detect that the second physical element is within a threshold distance of the first physical element;
    generate third content by importing a subset of the second set of the virtual objects from the second content into the first content; and
    display the third content on the display.

17. The device of claim 16, wherein the one or more programs further cause the device to:
    composite an affordance in association with a portion of the third content, wherein the affordance allows manipulation of the portion of the third content;

detect an input directed to the affordance; and display a manipulation of the portion of the third content in response to detecting the input directed to the affordance.

18. The device of claim 16, wherein the first set of entities includes a fictional character depicted in a fictional material.

19. The device of claim 16, wherein the threshold distance is a function of a size of the first physical element.

20. The device of claim 16, wherein the first content comprises a first video component and a first audio component, wherein the second content comprises a second video component and a second audio component, and wherein the third content comprises at least one of the first video component or the second video component and at least one of the first audio component or the second audio component.

21. A non-transitory memory storing one or more programs, which, when executed by one or more processors of a device with a display, cause the device to:

obtain first content in response to identifying a first physical element of a first object type, wherein the first content is associated with the first object type and the first content includes representations of a first set of virtual objects that models behavior of a first set of entities;

obtain second content in response to identifying a second physical element of a second object type, wherein the second content is associated with the second object type and the second content includes representations of a second set of virtual objects that models behavior of a second set of entities;

detect that the second physical element is within a threshold distance of the first physical element;

generate third content by importing a subset of the second set of the virtual objects from the second content into the first content; and display the third content on the display.

22. The non-transitory memory of claim 21, wherein the first set of entities includes a fictional entity.

23. The non-transitory memory of claim 21, wherein the one or more programs further cause the device to display the third content within a boundary of at least one of the first physical element or the second physical element.

24. The non-transitory memory of claim 21, wherein the one or more programs further cause the device to:

detect a user input interacting with a portion of the third content; and display a manipulation of the portion of the third content in response to detecting the user input.

25. The non-transitory memory of claim 21, wherein the one or more programs further cause the device to:

composite an affordance in association with a portion of the third content, wherein the affordance allows manipulation of the portion of the third content;

detect an input directed to the affordance; and display a manipulation of the portion of the third content in response to detecting the input directed to the affordance.

* * * * *